United States Patent

Yen et al.

(10) Patent No.: US 7,924,486 B2
(45) Date of Patent: Apr. 12, 2011

(54) MEMS SCAN CONTROLLER WITH INHERENT FREQUENCY AND METHOD OF CONTROL THEREOF

(75) Inventors: Wei-Shin Yen, Taipei (TW); Hung-Ta Leo, Taipei (TW)

(73) Assignee: E-Pin Optical Industry Co., Ltd., Taipei (TW)

(*) Notice: Subject to any disclaimer, the term of this patent is extended or adjusted under 35 U.S.C. 154(b) by 263 days.

(21) Appl. No.: 12/388,169

(22) Filed: Feb. 18, 2009

(65) Prior Publication Data

US 2009/0279156 A1 Nov. 12, 2009

(30) Foreign Application Priority Data

May 9, 2008 (TW) ................................ 97117282 A

(51) Int. Cl.
*G02B 26/08* (2006.01)
(52) U.S. Cl. .................................................. 359/199.1
(58) Field of Classification Search .... 359/197.1–199.1, 359/223.1–226.1, 871.872
See application file for complete search history.

(56) References Cited

U.S. PATENT DOCUMENTS

| | | | |
|---|---|---|---|
| 5,121,138 A | 6/1992 | Schermer et al. | |
| 5,408,352 A | 4/1995 | Peng | |
| 5,867,297 A | 2/1999 | Kiang et al. | |
| 6,838,661 B2 | 1/2005 | Klement | |
| 6,870,560 B2 | 3/2005 | Bush et al. | |
| 6,891,572 B2 | 5/2005 | Ueki | |
| 6,947,189 B2 | 9/2005 | Hagelin et al. | |
| 6,987,595 B2 | 1/2006 | Bush et al. | |
| 7,030,708 B2 * | 4/2006 | Klement | 359/199.1 |
| 7,190,499 B2 | 3/2007 | Deng et al. | |
| 7,304,411 B2 | 12/2007 | Klement et al. | |
| 2004/0119002 A1 | 6/2004 | Bush et al. | |
| 2005/0139678 A1 | 6/2005 | Helsel et al. | |
| 2005/0280879 A1 | 12/2005 | Gibson et al. | |
| 2006/0117854 A1 | 6/2006 | Turner | |
| 2006/0139113 A1 | 6/2006 | Menke | |
| 2006/0279364 A1 | 12/2006 | Klement | |
| 2007/0041068 A1 | 2/2007 | Heminger et al. | |
| 2007/0063134 A1 | 3/2007 | Wine et al. | |

FOREIGN PATENT DOCUMENTS

| | | |
|---|---|---|
| GB | 2378261 B | 8/2003 |
| JP | 63-314965 | 12/1988 |
| JP | 2-226114 | 9/1990 |
| JP | 2006-201350 | 8/2006 |
| TW | M253133 | 12/2004 |
| TW | I283952 | 7/2007 |

* cited by examiner

Primary Examiner — Euncha P Cherry
(74) Attorney, Agent, or Firm — Muncy, Geissler, Olds & Lowe, PLLC

(57) ABSTRACT

A MEMS scan controller with inherent frequency and a method of control thereof applied to controllers of a MEMS mirror of bidirectional scanning laser printers are disclosed. The amplitude of the MEMS mirror is adjusted by using the inherent frequency so that scan data string is sent within effective scanning window with preset frequency of a laser source of the laser printer and a certain time interval. Thus the controller is simplified and the high precision scanning is achieved.

12 Claims, 8 Drawing Sheets

MEMS SCAN CONTROLLER WITH INHERENT FREQUENCY AND METHOD OF CONTROL THEREOF

BACKGROUND OF THE INVENTION

The present invention relates to a Micro-Electronic-Mechanical-System (MEMS) scan controller and a control method thereof, especially to a controller for micro-electricmechanical mirrors (MEMS mirror) applied to bi-direction laser scanning units (LSU) and a control method thereof that perform scanning by the MEMS mirror with inherent resonant frequency within time interval of emittance of laser source.

Most of LSU available now uses a polygonal mirror rotating at high speed to control reflection direction of laser beam. However, due to hydraulic driving, working rotational speed limits, high manufacturing cost, high noises and delayed initiation, such LSU is unable to meet requirements of high speed and high precision by using polygon mirror. In recent years, MEMS mirrors with torsion oscillators are getting known and are going to be applied to LSU of imaging systems, scanners or laser printers in future. The MEMS oscillatory mirror developed based on principle of torsion oscillators has higher scanning efficiency than conventional polygon mirror.

In a laser scanning unit (LSU), a Micro-Electronic-Mechanical-System (MEMS) oscillating mirror mainly consists of a torsion oscillator and a mirror. The MEMS mirror is controlled by a MEMS scan controller. MEMS mirror driven by resonance magnetic field symmetrically oscillates along an axis. When a laser light is emitted to the mirror of the MEMS mirror, the MEMS oscillating mirror reflects the incident laser beam to the axis of the MEMS mirror at different angles for scanning along with different reflecting angles of the mirror surface that changes with time. Since the MEMS mirror scanning approach can neglect the wavelength effects, that the MEMS mirror has features of high resolution and large rotation angle so that has been applied broadly to commercial products, science and industries, such as devices disclosed in U.S. Pat. Nos. 5,408,352, 5,867,297, 6,947,189, 7,190,499, US App. No 2007/0063134, TW Patent M253133, TW 1283952 and JP 2006-201350, JP63-314965, etc. In order to improve scanning efficiency, a bi-directional LSU is developed yet associated control difficulties are raised.

Due to resonant oscillation of the MEMS mirror, the rotation angles and stability of the MEMS have effects on precision of the LSU. In a controller for bi-directional LSU of the MEMS mirror, conventional technique focuses on stability control of the MEMS mirror such as adjustment of resonant frequency, working angle, or by means of a voltage controlled oscillator (VCO) to control the frequency. The frequency control of the VOC is based on changing permittivity of dielectric material by current or change of the capacitance by the voltage, as shown in US2005/0280879, US2006/0139113, US2005/0139678, US2007/0041068, US2004/0119002, U.S. Pat. Nos. 7,304,411, 5,121,138, and JP63-314965, etc. Take a bi-directional LSU with 600 dots-per-inch (dpi) resolution per A4 size as an example, 5102 light spots are sent per each scanning in one directional. The 5102 light spots are sent completely during an imaging interval while the imaging interval should be invariant with the frequency or amplitude variations of the MEMS mirror that lead to deviation of the light spot and the image is not formed on the object. Thus the calculation frequency of the MEMS mirror for sending correct signal to the laser controller that emits laser light is a main point of control.

Various MEMS mirrors have a bit difference in their structure and thus their inherent resonant frequency are different. As show in US2006/0279364, U.S. Pat. Nos. 6,891,572, 6,870,560, 6,987,595, 6,838,661, and US2006/0117854, disclosed the techniques as the MEMS mirror are controlled by reference table, synchronous scan signal, counter or detection of PD position, etc. A control way revealed by the GB2378261 is by prediction molding. In JP2226114, a comparison way of dual voltage is used. However, these control devices have complicated structure, sophisticated calculation and large memory so as to control stability of the MEMS mirror oscillation and make oscillation of the MEMS mirror with different resonant frequency become consistent. Therefore, the MEMS LSU can scan precisely within the effective scanning window.

SUMMARY OF THE INVENTION

Therefore it is a primary object of the present invention to provide a MEMS scan controller with inherent frequency disposed on a MEMS laser scanning unit (LSU) for being applied to bidirectional scanning laser printers or multifunction printers. By means of the MEMS scan controller, the MEMS mirror oscillates in resonant frequency and amplitude of the MEMS mirror is controlled so that laser beam can perform scanning accurately within effective scanning area.

A MEMS scan controller of the present invention is applied to a MEMS LSU that consists of a laser source, a MEMS mirror, at least one photoelectric detector (PD), a scan lens and a MEMS scan controller. The scan lens includes at least one optical lens that corrects scanning light reflected by the MEMS mirror into linear time scanning light within resonant frequency range of the MEMS mirror. The MEMS scan controller with inherent frequency of the present invention makes the MEMS mirror oscillate stably with inherent resonant frequency and preset angle. The MEMS scan controller includes at least one control logic, at least one control signal output unit and at least one bridge circuit. The control logic receives PD signals from the PD and sends out modulation signals for control of the bridge circuit. The oscillation of the MEMS mirror becomes stable through the bridge circuit that controls resonant angle (or amplitude) and inherent resonant frequency of the MEMS mirror. After the oscillation of the MEMS mirror becoming stable, the control logic sends a stable signal to the control signal output unit and the control signal output unit sends the stable signal. Based on the protocol between the stable signal and the laser controller, the laser controller is controlled to send scanning data string. The control signal output unit further sends a trigger signal that makes the laser controller start/stop sending scan data string. The control logic further sends frequency error signals to the laser controller so as to make laser controller adjust frequency of the scan data string for correct transmission of the scan data within the scan window.

A control method for MEMS scan controllers according to the present invention includes the following steps:
- S1: check whether the laser controller sends enable (ENB) signals or not; once the laser controller sends the ENB signal, the MEMS scan controller is turned on; the control logic of the MEMS scan controller sends modulation signals for driving the bridge circuit to make the MEMS mirror start oscillation; the control logic also calculates scan frequency and scan amplitude;
- S2: the control logic of the MEMS scan controller sends modulation signals (having a first modulation signal, a second modulation signal, and a third modulation signal) so as to make the MEMS mirror oscillate stably with preset amplitude; a control way that stabilizes oscillation of the MEMS mirror includes the following steps from S21 to S26;

S3: after the MEMS mirror becoming stable, the control signal output unit of the MEMS scan controller sends stable signals, trigger signals or frequency error signals to the laser controller.

A way to control amplitude of the MEMS mirror according to the present invention by means of a PD for stabilizing oscillation of the MEMS mirror includes the following steps:

S21: set an initial value of load D and set an initial value of cycle T;

S22: check PD signals and whether there are twice triggerings by the PD (that means PD is triggered twice) within a half-cycle T; if not, start to adjust the amplitude;

S23: check time of the two triggerings of the PD signals; if it's over 5%, start to modify the amplitude, wherein the range of 5% is changeable and is preset according to required control precision;

S24: while adjusting the amplitude, adjust (increase or decrease) the value of the load D so that there are two PD signals triggered within a half-cycle;

S25: the MEMS scan controller checks whether the MEMS mirror is stable; after the MEMS mirror becoming stable, the MEMS scan controller sends a stable signal;

S26: once the laser controller receives the stable signal, the scan data is sent in preset frequency of $f_{data}$ within preset time interval ($T_2$ or $T_4$).

Alternative step S2 of a control way of the MEMS mirror with two PD detectors further includes the following steps:

S21: set an initial value of load D and set an initial value of cycle T;

S22: check two PD signals and whether the first PD or the second PD is triggered twice within a half-cycle T; if not, start to adjust the amplitude (step S25);

S23: check time of two triggerings of the PD signals, once the ratio is over 5%, adjust the amplitude; wherein the range of 5% is changeable and is preset according to required control precision;

S24: while adjusting the amplitude, adjust (increase or decrease) the value of the load D so as to make the two PD respectively be triggered twice within a half-cycle;

S25: the MEMS scan controller checks whether the MEMS mirror is stable and after the MEMS mirror being stable, the MEMS scan controller sends a stable signal;

S26: once the laser controller receives the stable signal, the scan data is sent in preset frequency of $f_{data}$ within preset time interval ($T_2$ or $T_4$).

The scan lens can be formed by a single lens, two lenses or multiple lenses. Thus it is another object of the present invention to provide a MEMS scan controller applied to MEMS scanning units with a single scan lens, two scan lenses or multiple scan lenses. When two lens type is used, the first scan lens corrects the scanning light into linear time scanning light while the second (or other) scan lens adjusts its position according to inherent resonant frequency of various MEMS mirror for further correcting the scanning light into a linear time scanning light. Thus the preset scan data string is sent within effective scanning window.

DETAILED DESCRIPTION OF THE PREFERRED EMBODIMENT

Figure 1:
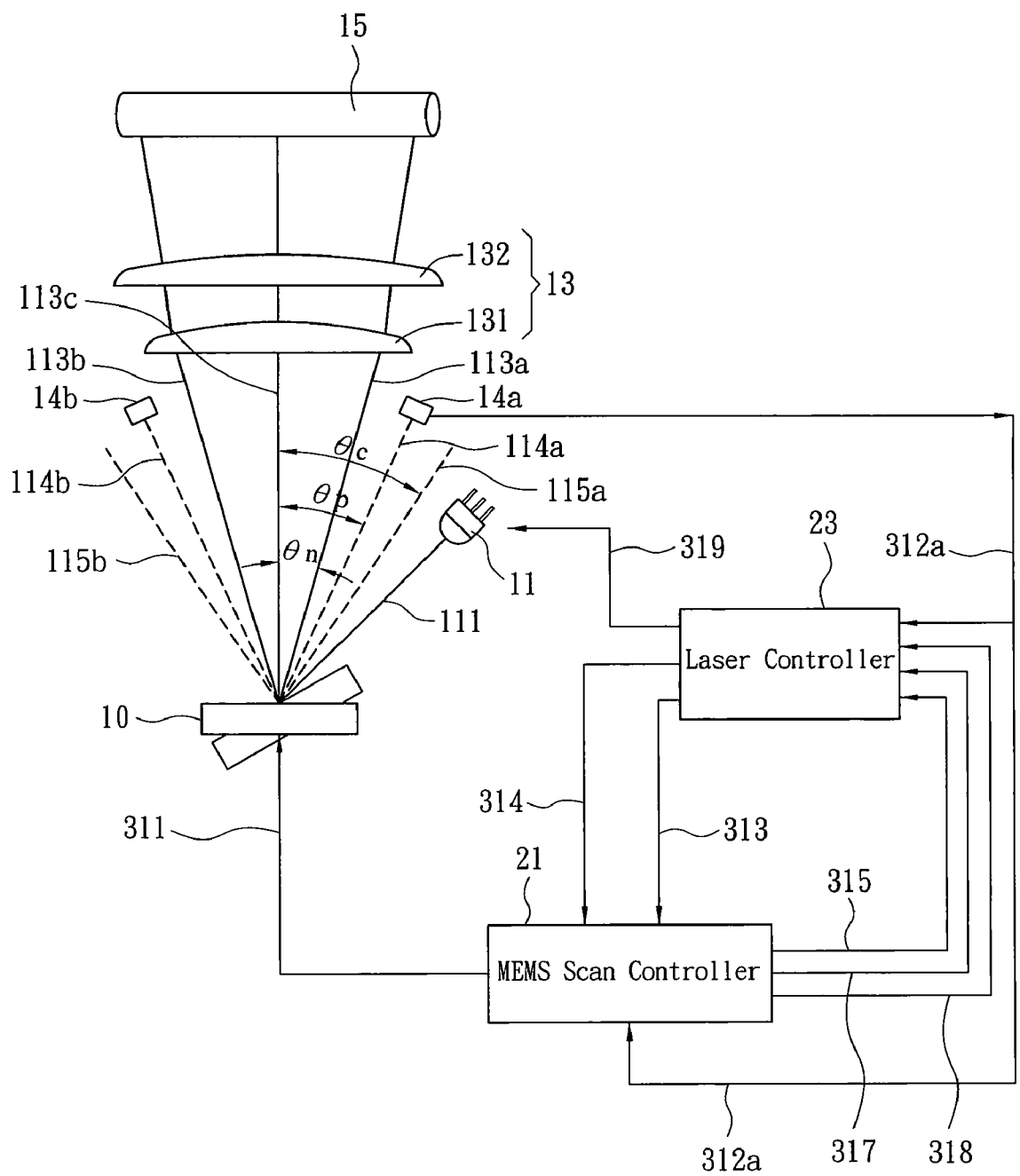
FIG. 1 is a schematic drawing showing an embodiment of a bi-direction laser scanning unit (LSU) according to the present invention.

Refer to FIG. 1, in a MEMS LSU, a laser source is controlled by laser printers or laser controllers of multifunction printers. When the laser controller sends out scanning data, discontinuous laser light from the laser source projects to a reflective surface of the MEMS mirror in frequency $f_{data}$, the MEMS mirror oscillates in resonant frequency and turns the laser light into scanning light that is corrected by at least one scan lens to form an image on an object. When the laser controller is designed to send laser light for scanning in fixed frequency $f_{data}$, the MEMS scan controller of the present invention makes laser light perform scanning accurately within effective scanning area. Each MEMS mirror has a bit difference at the structure so that their inherence resonant frequency $f_0$ is difference in essence, within manufacturing tolerance. However, the little resonant frequency variation is amplified through light path so that there is an obvious difference or deviation of light spots. When the MEMS mirror oscillates in forward and reverse direction to scan laser light into scanning light, the effective scanning area for performing scanning is called scanning window. The scanning light is imaged on object within sacking window and the scanning light is detected by photoelectric detectors (PD) over the scanning window. The MEMS scan controller controls the MEMS mirror to oscillate in inherence resonant frequency and in preset angle by control of oscillation amplitude. When the MEMS mirror becomes stable, the MEMS scan controller sends a stable signal to inform the laser controller and the laser controller sends scan data string within time interval and preset frequency $f_{data}$. According to the scan data string, the laser source emits laser beams so as to generate certain amounts of light spots matching required resolution within the effective scanning window.

Because oscillation frequency of the MEMS mirror and scan frequency $f_{data}$ of the laser controller need to match each other within the scanning window, when the scan frequency $f_{data}$ of the laser controller is away from preset value, a control signal output unit further sends a frequency error signal to the laser controller for adjusting scan frequency $f_{data}$.

Figure 2:
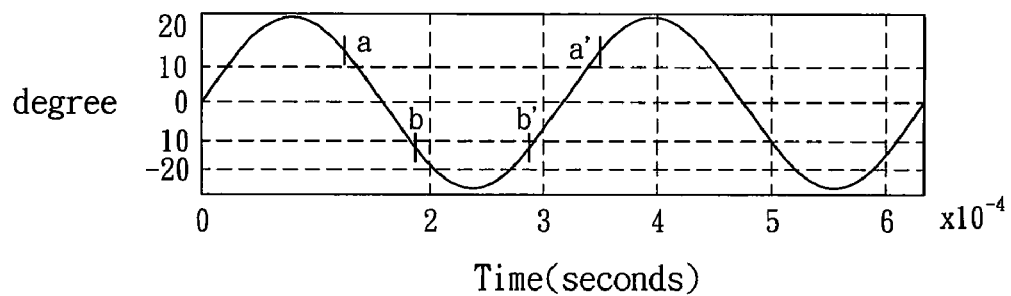
FIG. 2 is a schematic drawing showing relationship between angles of the laser light reflected by a MEMS mirror and time of the PD that emits PD signal.
Figure 4:
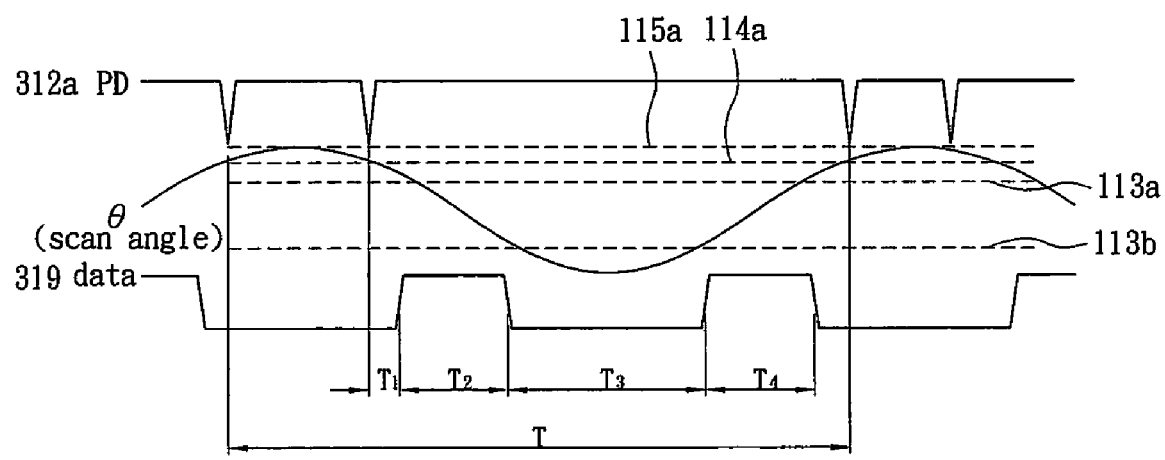
FIG. 4 shows relationship among PD signals, angle of scanning light and time.

The MEMS mirror oscillates in frequency $f_0$, a complete cycle period from the left side to the right side and then back to the left side is T and the scanning angle is 2θ. The relationship between the scanning angle θ and the time is a sin save, as shown in FIG. 2. In order to prevent scanning deformation, within a cycle period T, two sections of time a~b and a'~b' during which the curve is most close to a line are selected as time interval for emitting laser light. Refer to FIG. 4, $T_2$ and $T_4$ respectively are time of the forward scanning and time of the reverse scanning, in which the curve is the most close to a line. The relationship among $T_1$, $T_2$, $T_3$, $T_4$ is shown in follow equations:

$$T_1 = \sin^{-1}\left(\frac{\theta_p}{\theta_c}\right) \cdot \frac{1}{2\pi f_o} - \sin^{-1}\left(\frac{\theta_n}{\theta_c}\right) \cdot \frac{1}{2\pi f_o} \quad (1)$$

$$T_2 = 2\sin^{-1}\left(\frac{\theta_n}{\theta_c}\right) \cdot \frac{1}{2\pi f_0} \quad (2)$$

$$T_3 = \frac{1}{2}(T - 2T_2) \quad (3)$$

$$T_4 = T_2 \quad (4)$$

wherein $T_1$ is delay time, $T_2$ is time of the forward scanning, $T_3$ is delay time, $T_4$ is time of the reverse scanning, $f_0$ is inherent frequency of the MEMS mirror, $2\theta_c$ is scanning angle of the MEMS mirror, $2\theta_p$ is the angle of the PD, and $2\theta_n$ is an effective scanning window formed within effective scanning angle.

For example to 600 dots-per-inch (dpi) resolution per A4 size, once each row generates 5102 light spots:

$$f_{data} = \frac{1}{T_2} 5102 \quad (5)$$

$f_{data}$ is preset by laser printers or multifunction printers. The time of the forward scanning $T_2$ or the time of the reverse scanning $T_4$ can be calculated from the equation (5). When the MEMS mirrors becomes stable, the laser controller can be sent scan data string within the effective scanning angle $2\theta_n$. The scanning light within effective scanning angle is scanned and reflected by the MEMS mirror. As shown in FIG. 2, angle of the MEMS mirror changes along with time in a sine curve. The segments a~b or a'~b' in which the curve is most close to a line are effective scan window. However, in the position near point a or point b (near point a' or point b'), the angular velocity is different from that of the position near the center of the segment a~b. This is corrected by a scan lens that turns the scanning light into linear time scanning light.

The First Embodiment

Refer to FIG. 1, the embodiment is applied to MEMS LSU with a PD. A laser source 11 in the MEMS LSU is controlled by a laser controller 22. When the laser controller 22 sends out scanning data 319, the laser source 11 emits laser light 111 toward a reflective surface of a MEMS mirror 10 that oscillates in resonant frequency $f_0$. In this embodiment, frequency of the MEMS mirror 10 is 2500±3% HZ (inherence resonant frequency is within this range of individual MEMS mirror) and maximum scanning angle is ±23°. The laser light 111 with scanning angle of ±23°*2 ($\theta_c$=23°*2) ranges from right-side scanning light 115a to left-side scanning light 115b. The scanning light ranging from 113a to 113b is within angle of $2\theta_n$ and is called effective scanning window. The scanning light passes a scan lens 13 and forms an image on an object 15 such as a photo conductor. A PD 14a is disposed at angle 21° ($\theta_p$=±21°*2) for detecting scanning light 114a and converting the light into electric trigger signal. In order to keep stability of the angle $2\theta_c$, the MEMS mirror 10 is controlled by a MEMS scan controller 21 that sends driving signals 311 for driving the MEMS mirror 10 to oscillate. When the MEMS mirror 10 oscillates too strong or too weak, the MEMS scan controller 21 will send the driving signals 311.

Figure 3:
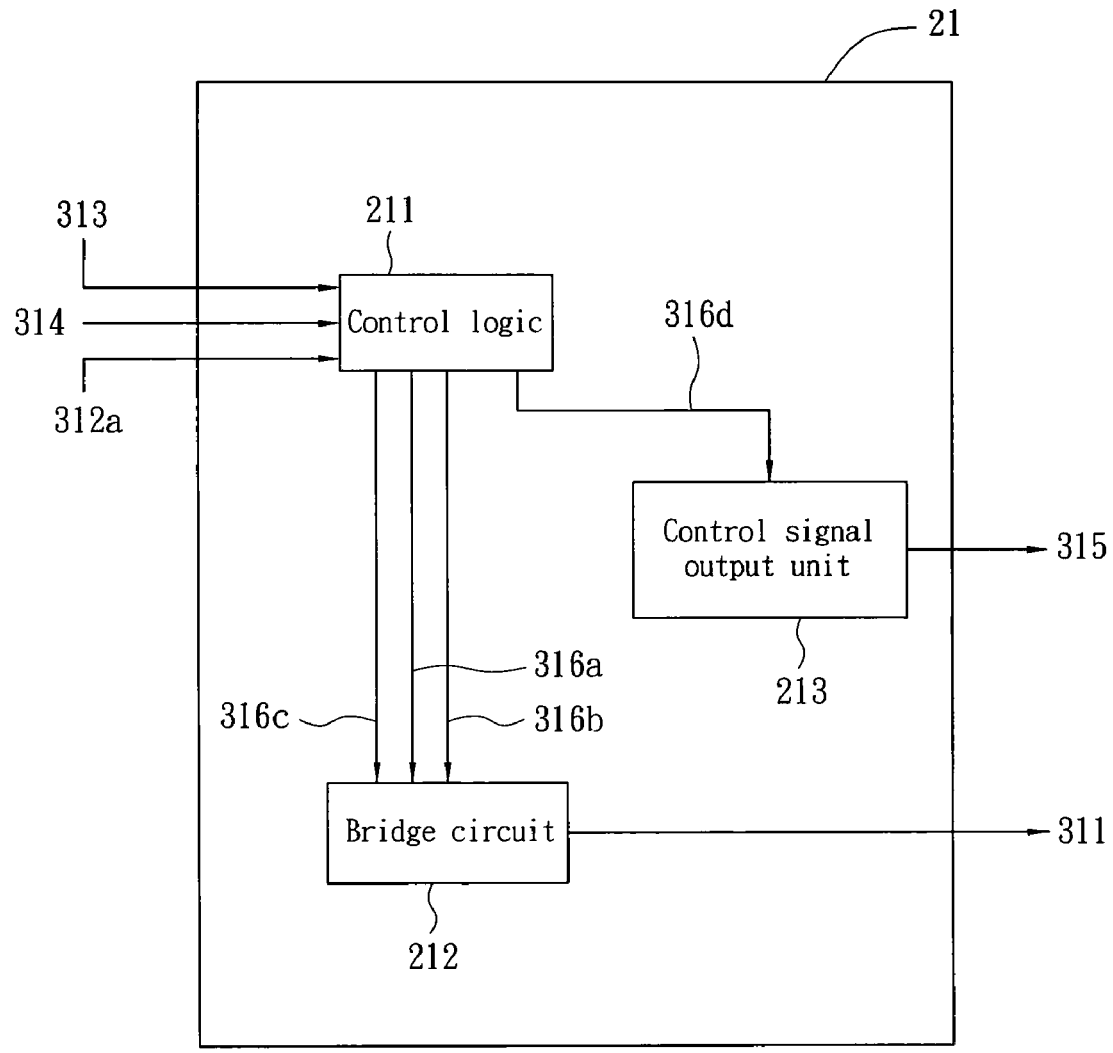
FIG. 3 is a schematic drawing of an embodiment of a MEMS scan controller according to the present invention.

Refer to FIG. 3, the MEMS scan controller 21 consists of a control logic 211, a control signal output unit 213 and a bridge circuit 212. The control logic receives PD signals 312a, calculates amplitude of the MEMS mirror 10 and outputs a first modulation signal 316a, a second modulation signal 316b and a third modulation signal 316c. The bridge circuit 212 receives the first, the second and the third modulation signals 316a, 316b, 316c and generates driving signals 311 for control of the MEMS mirror 10. The control signal output unit 213 receives an amplitude variance signal 316d from the control logic 211 and sends a stable signal 315. Moreover, the laser controller 22 is a main controller of laser printers or multifunction printers for sending scan data 319 to control the laser source 11, sending enable (ENB) signals 313 that turn on the MEMS mirror 10, and sending adjust signals 314 that adjust the MEMS mirror 10 so as to check whether the MEMS mirror 10 becomes stable, whether the scan data 319 can be sent and whether the scan data 319 is sent in frequency $f_{data}$ within $T_2$ (or $T_4$) time interval. Because the $T_2$ (or $T_4$) time interval and frequency $f_{data}$ are set by laser printers or multifunction printers, the MEMS LSU only requires to check whether the amplitude of the MEMS mirror 10 matches the $T_2$ (or $T_4$) time interval. Thus the present invention is applied to laser printers or multifunction printers directly without complicated control and protocols.

The control logic 211 receives ENB signals 313 and adjust signals 314 from the laser controller 22 and PD signals 312a from the PD 14a for detecting amplitude of the MEMS mirror 10 (time interval between two contiguous triggers of the PD 14a). The control logic 211 sends the amplitude variance signal 316d to the control signal output unit 213, or modifies and sends the first, the second and the third modulation signals 316a, 316b, 316c to the bridge circuit 212. The control signal output unit 231 receives the amplitude variance signal 316d from the control logic 211 and converts it into a stable signal 315 so as to inform the laser controller 22 that the MEMS mirror 10 has become stable. According to various combinations of the first, the second and the third modulation signals 316a, 316b, 316c, the bridge circuit 212 generates different driving signals for control of the amplitude of the MEMS mirror 10. When the MEMS mirror 10 oscillates, once the time interval (cycle T) that the amplitude of the MEMS mirror 10 triggers the PD 14a twice becomes stable, the laser controller 22 sends the scan data 319. Refer to FIG. 2, the MEMS mirror 10 oscillates around the Y-axis, along the X axis and the oscillation angle is ±$\theta_c$ to the right and left. At any time t, the angle θ(t) between an optical axis 113c and scanning light from reflection of the laser light 111 is a sin wave along with time. When the reflected scanning light arrives the PD 14a, a first-time triggered PD signal 312a is generated. When the MEMS mirror 10 oscillates to the right edge with an angle $\theta_c$, the angle θ(t) is maximum. Then the MEMS mirror 10 moves back and the angle θ(t) is reduced. When the reflected scanning light arrives the PD 14a, a second-time triggered PD signal 312a is generated. When the scanning light arrives within the effective scanning window (from 113a to 113b, the point a to the point b in FIG. 2), now the relationship between the angle θ(t) and the time t is most close to a line. This is the effective scanning window of the forward scanning. When the MEMS mirror 10 oscillates to the left edge with the maximum angle $θ_c$, the angle θ(t) is maximum. Then the MEMS mirror 10 moves back and the angle θ(t) is reduced. When the scanning light arrives within the effective scanning window (from 113b to 113a, the point b' to the point a' in FIG. 2), this is the effective scanning window of the reverse scanning. When the MEMS mirror 10 keeps moving to the right and the scanning light arrives the PD 14a, a third-time triggered PD signal 312a is generated and a scan cycle $±θ_c$ is completed. The MEMS mirror 10 moves back after arriving the maximum angle $θ_c$ and the angle θ(t) is reduced. When the scanning light arrives the PD 14a, a fourth-time triggered PD signal 312a is generated.

The MEMS mirror oscillates in frequency $f_0$, and a complete cycle period from the left side to the right side is T (scan cycle). The forward scanning and the reverse scanning are shown in FIG. 4. In a scan cycle, when the θ(t) is reduced from position of the scanning light 114a, it's delay time $T_1$. Now the relationship between the angle θ(t) and the time t is most close to a line. The laser controller 22 sends the scanning data 319 and the time of sending is $T_2$. This is the effective scanning window of the forward scanning. After the delay time $T_3$, the laser controller 22 sends the scanning data 319 and the time of sending is $T_4$. This is the effective scanning window of the reverse scanning. The $T_1$, $T_2$, $T_3$, and $T_4$ are within the same scan cycle T. The relationship among $T_1$, $T_2$, $T_3$, and $T_4$ is as following: if $f_0$=2500 HZ then $T_1$=1.137×10$^{-5}$, $T_2$=$T_4$=1.2377×10$^{-4}$, $T_3$=7.623×10$^{-5}$ (sec), $f_{data}$=3.7×10$^7$ (HZ) can be obtained by equation (1) to equation (5).

Figure 5:
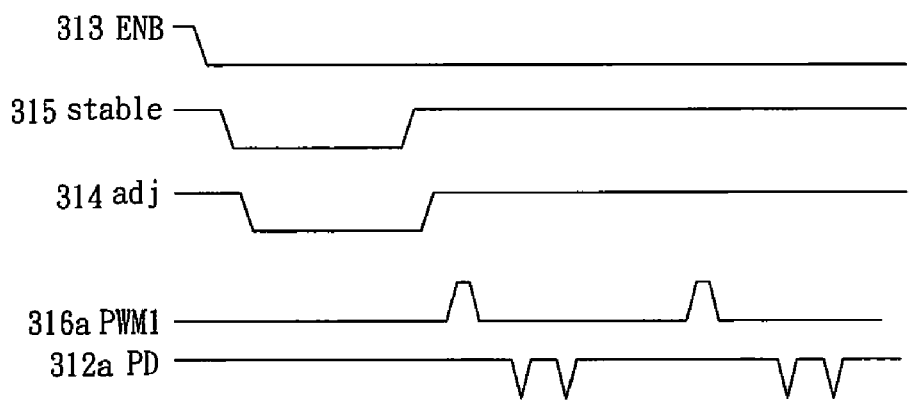
FIG. 5 shows that an embodiment of a MEMS scan controller sends a first modulation signal after the MEMS scan controller receiving signals from a laser controller as well as PD signals.

When the ENB signals 313 from the laser controller 22 is at high potential, disenabling the MEMS mirror 10. When the high potential turns into low potential, enabling of the MEMS mirror 10 is sent, as shown in FIG. 5. After enabling of the MEMS mirror 10, the MEMS mirror 10 may be unstable in the beginning and now the laser controller 22 controls the stable signal 315 from the control signal output unit 213 at low potential and so does the adjust signal 314. The control logic 211 sends a first modulation signal 316a, a second modulation signal 316b, and a third modulation signal 316c. Passing through the bridge circuit 22, the modulation signals 316a, 316b, 316c drive the MEMS mirror 10 to oscillating. After a period of time, the MEMS mirror 10 has been stable and the stable signal 315 as well as the adjust signal 314 turns into high potential. Since the MEMS mirror 10 oscillating forward and reverse, there are two times of triggering of the PD 14a within each scan half-cycle T. Thus a trigger period T of the PD signal 312a is obtained by calculation of the control logic 211. While calculating $T_1$, $T_2$, $T_3$, $T_4$, the control logic 211 of the MEMS scan controller 21 receives the PD signals 312a from the PD 14a and calculates each PD signal 312a for adjusting amplitude of the MEMS mirror 10.

Figure 6:
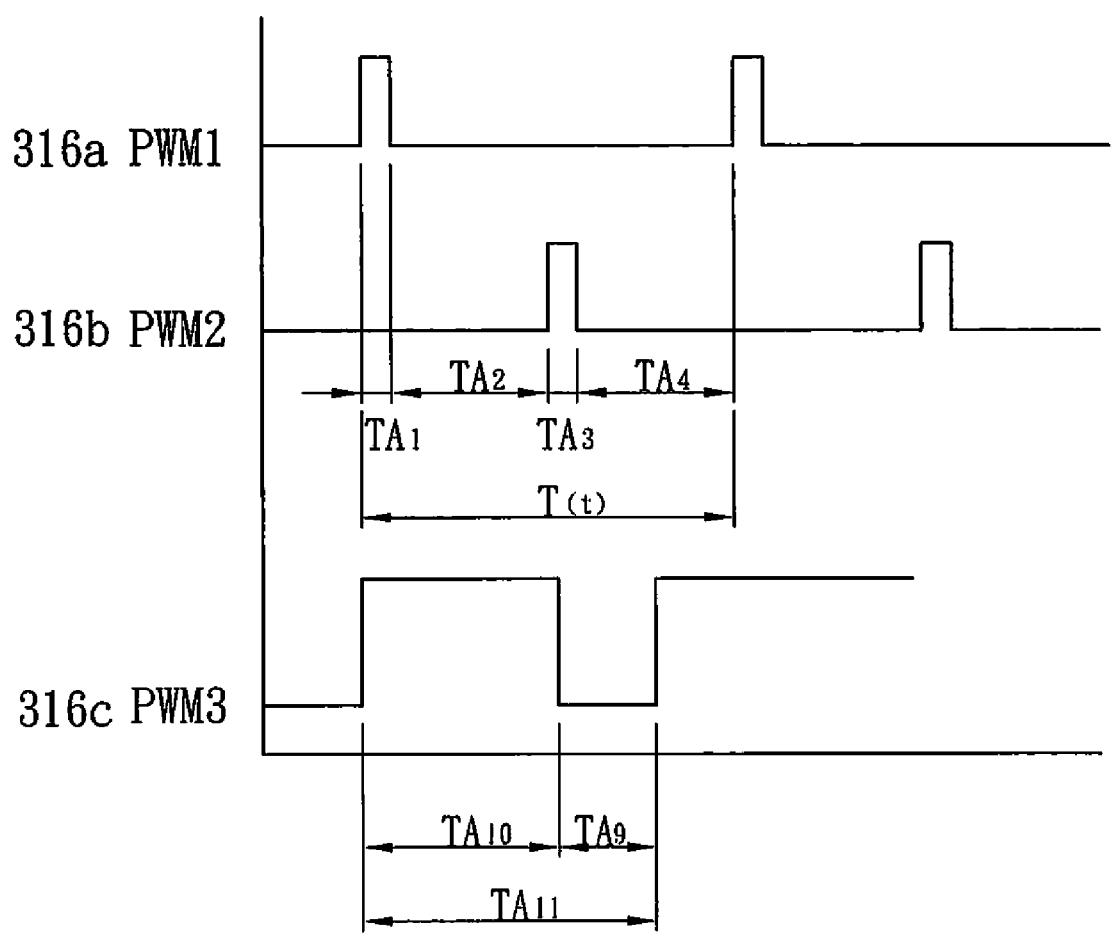
FIG. 6 shows relationship among the first modulation signal, the second modulation signal, and the third modulation signal according to the present invention.

Refer to FIG. 6, pulse of the first, the second and the third modulation signals 316a, 316b, 316c are selected as following: inside a resonant cycle T, pulse duration of the first and the second modulation signals 316a, 316b respectively is $TA_1$ and $TA_3$ while $TA_1$ is set to be equal to $TA_3$. Time intervals of the pulse duration of the first and the second modulation signals 316a, 316b respectively are $TA_2$ and $TA_4$ while $TA_2$ is set to be equal to $TA_4$. $TA_1+TA_2+TA_3+TA_4$=T. That means within the resonant cycle T, the first and the second modulation signals 316a, 316b respectively are sent once. Thus the first and the second modulation signals 316a, 316b drive the MEMS mirror 10 to oscillate in resonant frequency of 1/T. There is no restriction on $TA_1/TA_4$ ratio and the ratio varies according to the requirement of control loops. In this embodiment, $TA_1/TA_4$=¼. The third modulation signal 316c changes from high potential to low potential. The ratio between high-potential time $TA_{10}$ and low-potential time $TA_9$ is the adjustment reference of load D. If frequency of the third modulation signal 316c is set as 1K (in this embodiment, generally the frequency is not limited). $TA_{11}$=1/1000, D=$TA_{10}$/$TA_{11}$, $TA_9+TA_{10}=TA_{11}$. By adjusting value of D, waveform of the third modulation signal 316c is modified. Thus the amplitude of the MEMS mirror 10 is changed through the bridge circuit 212.

Figure 7:
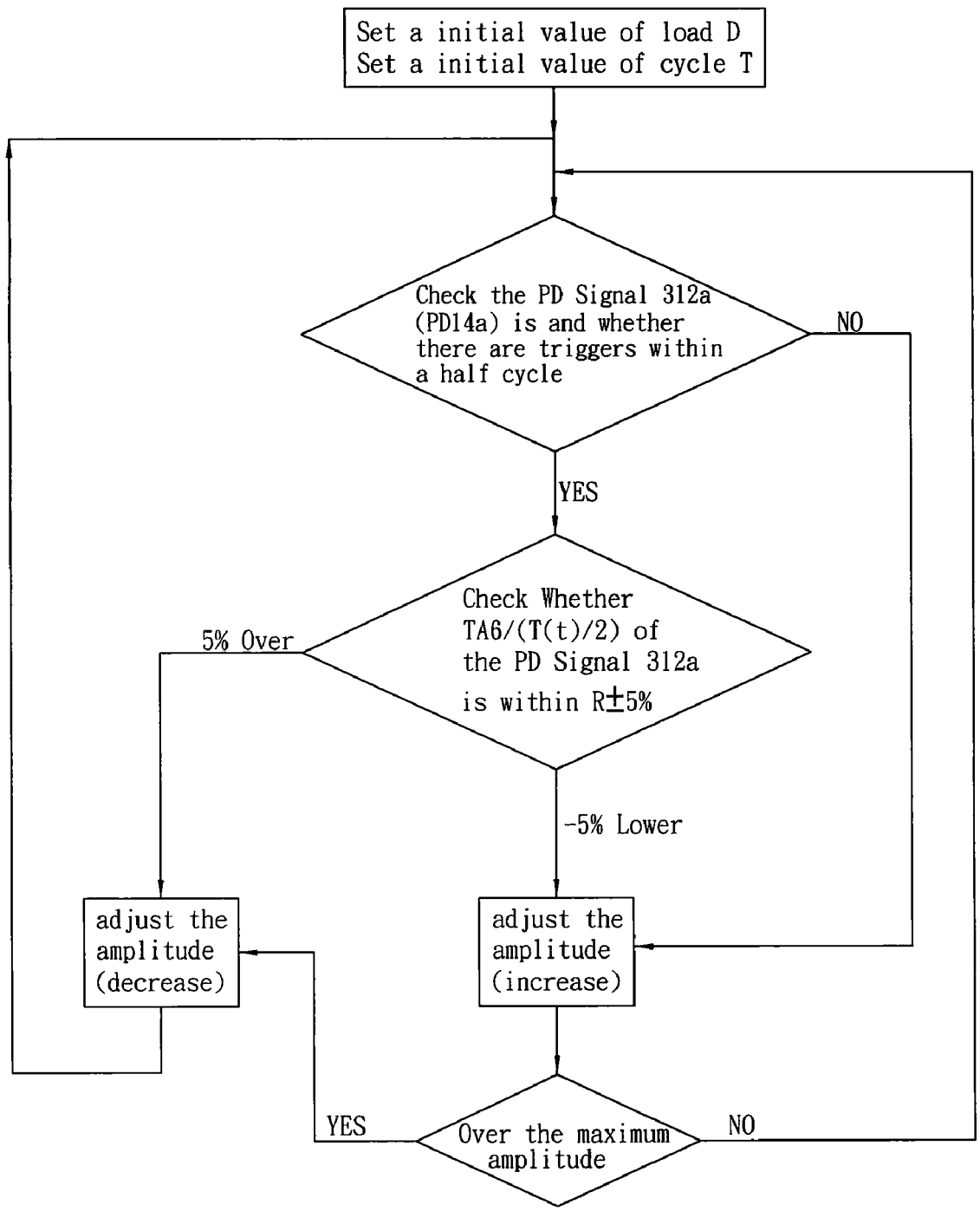
FIG. 7 is a flow chart showing control of the MEMS scan controller according to the present invention.

Refer to FIG. 7, a control method includes the following steps:
S21: set an initial value of the load D (in this embodiment, D=90%), set an initial value of the cycle T (in this embodiment, T=1/fL=4.21×10$^{-4}$ sec), and make the laser source 11 emit laser light 111 under the control of the laser controller 22;
S22: check the PD signal 312a and whether there are two triggerings of the PD 14a within a half cycle (the cycle is 4.21×10$^{-4}$ sec);
S23: set the first modulation signal 316a, the second modulation signal 316b and the third modulation signal 316 at low potential by frequency adjustment;
S24: check whether the trigger time of the PD signal 312a is within 3%. Once the time is within the range, the signal is continuous stable and the laser scan controller 21 sends a stable signal 315. If the trigger time is over 3%, start to adjust the amplitude;
S25: while adjusting the amplitude, adjust (increase or decrease) the value of the load D so as to make the PD 14a be triggered twice within a half-cycle.

Figure 8:
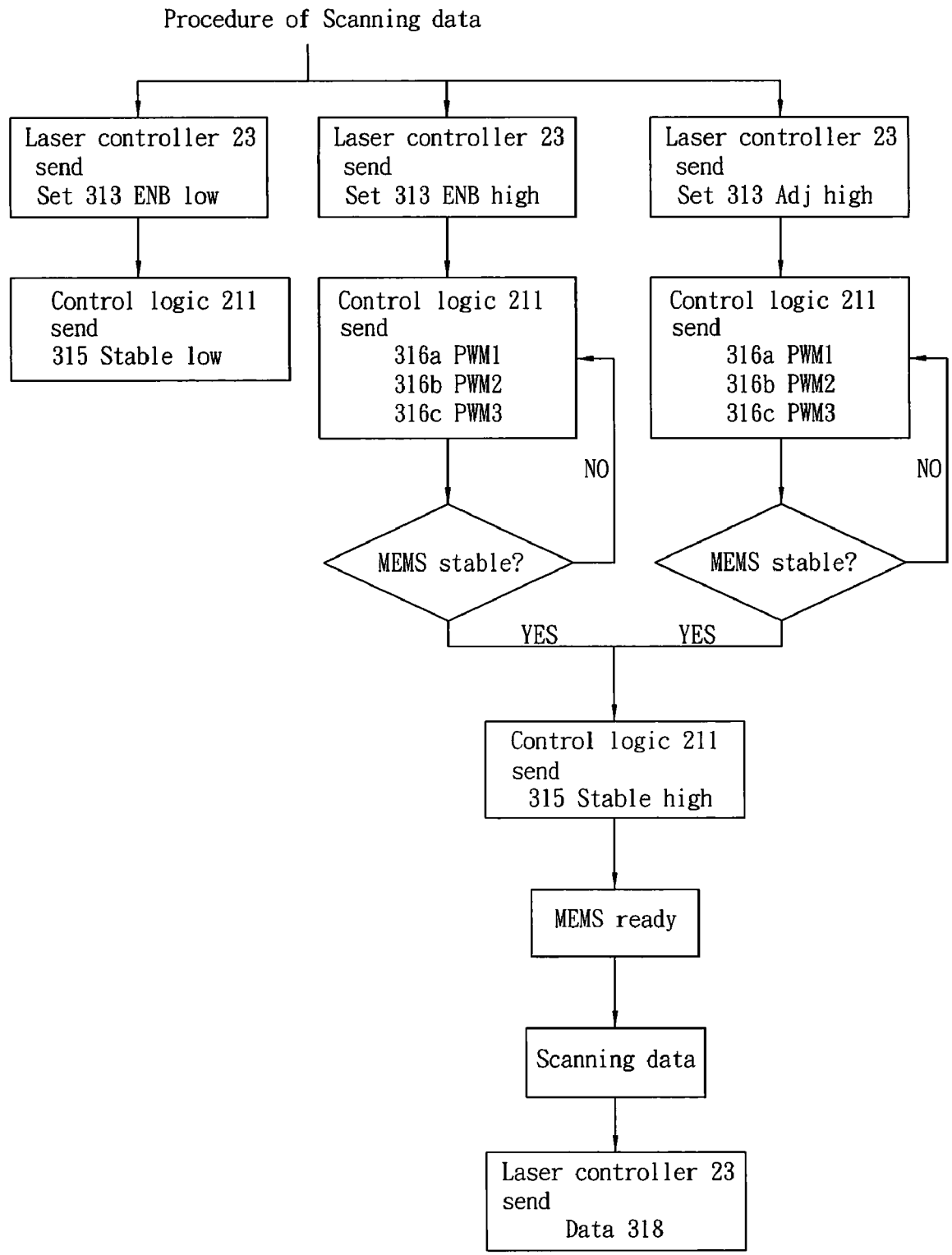
FIG. 8 is a flow chart showing control of scan data string according to the present invention.

The way of sending the scan data string is as shown in FIG. 8. Once the laser controller 22 sends the ENB signals 313 or the adjust signal 314, the control logic 211 calculates and sends the first, the second and the third modulation signals 316a, 316b, 316c to the bridge circuit 212. The bridge circuit 212 sends the driving signal 311 for amplitude adjustment and the control logic 211 checks whether the MEMS mirror 10 becomes stable. Now the starting-up of the MEMS mirror 10 is finished.

After the MEMS mirror 20 becoming stable, the control logic 211 of the MEMS scan controller 21 sends signals to the control signal output unit 213 and the control signal output unit 213 sends the stable signal 315. A protocol can be preset between the stable signal 315 and the laser controller 22. The stable signal 315 can be a signal that changes from low potential to high potential/from high potential to low potential, or a signal that outputs a specified frequency.

After the PD 14a is triggered and delay a time $T_1$, the MEMS scan controller 21 sends forward scan data string in the preset transmission frequency $f_{data}$ for the time of $T_2$ (the forward scanning time). After finishing sending of the forward scan data string and delay a time $T_3$, reverse scan data string is sent for the time of $T_4$ (the reverse scanning time).

The transmission frequency $f_{data}$ and scanning time $T_2$, $T_4$ of the laser controller 22 are preset. The MEMS scan controller 21 controls the MEMS mirror 10 to trigger the PD 14a with inherent resonant frequency $f_0$ and the amplitude so that the scan data 319 is sent within time interval $T_2$ or $T_4$. One object of the present invention is to provide a MEMS scan controller 21 that sends the stable signal 315 after oscillation of the MEMS mirror 10 becoming stable so as to make the MEMS scan controller 21 send the scan data 319 in preset transmission frequency $f_{data}$ within the effective scanning window (within time interval $T_2$ or $T_4$).

Figure 9:
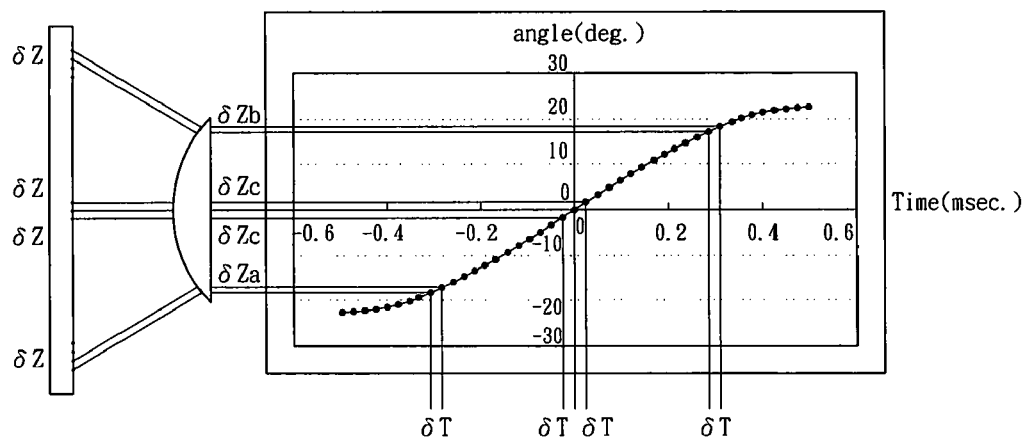
FIG. 9 is a schematic drawing showing correction of light spot by the scan lens according to the present invention.

Refer to FIG. 9, while scanning forward, the MEMS scan controller 21 sends the scan data string to the laser source 11 for time interval $T_2$ within time interval a~b. The laser source 11 emits laser light 11 through the MEMS mirror 10 to be scanned forward into scanning light 113a~113b. Within a~b, the angular velocity varies. Although θ(t) is near a line within time interval a~b, the scan lens 13 is function to correct the scanning light 113a~113b to form an image on the object 15 so as to improve scanning quality. Assume, the time interval between two light spots is δT. Because the angular velocity near the point a or the point b is smaller than that of the central point c, the distance between light spots δZa, δZb is smaller than δZc after being scanned by the MEMS mirror 10. The scan lens 13 includes optical surfaces that corrects unequal-distance δZa and δZb to make the light spot projected on the object 15 is equal-distance δZ in same time interval δT. Thus the scanning deformation is corrected to achieve linear scanning with high precision.

If the scan data 319 of laser printers or multifunction printers is sent in the frequency of 35 MHZ, forward/reverse scanning respectively for 5102 data, the transmission interval $T_2=T_4=0.1458$ msec is got from the Eq. (5). The laser controller 22 will sends the data in 0.1458 msec. Once the MEMS mirror 10 with frequency of 2500 HZ is used, $\theta_n=\pm 20.95°$ is got from the Eq. (2). As to the individual different inherent resonant frequency $f_0=2575\sim2425$ HZ, the scanning angle $\theta_n$ is $\pm21.26°\sim\pm20.601°$ when $T_2=T_4=0.1458$ msec, or $\Delta\theta_n=0.3295$. When two MEMS mirror 10 with different inherent resonant frequency are arranged on two printers or multifunction printers, the maximum difference angle between two papers on the printers is 0.3295 and the print quality is within the acceptable range.

The Second Embodiment

This embodiment is applied to MEMS LSU with two PDs. Refer to FIG. 1, another PD 14b is disposed at $\theta_p=-21°$. The MEMS mirror 10 in this embodiment is with inherent resonant frequency of 2500±3% HZ ($f_0=2500\pm3\%$ HZ), the maximum scanning angle is ±23°. The MEMS scan controller 21 receives the ENB signal 313 from the laser controller 22, the adjust signal 314 from the laser controller 22, the PD signal 312a from the PD 14a and the PD signal 312b from the PD 14b so as to detect the amplitude of the MEMS mirror 10 and generate driving signals 311 for control of the MEMS mirror 10.

Refer to FIG. 3, the MEMS scan controller 21 consists of a control logic 211, a control signal output unit 213 and a bridge circuit 212. The control logic 211 receives ENB signals 313 from the laser controller 22, adjust signals 314 from the laser controller 22, PD signals 312b from the PD 14b, and PD signals 312a from the PD 14a for detecting amplitude of the MEMS mirror 10 (time interval between two contiguous triggers of the PD 14a). The control logic 211 sends the amplitude variance signal 316d to the control signal output unit 213, or changes and sends the first, the second and the third modulation signals 316a, 316b, 316c to the bridge circuit 212. The control signal output unit 231 receives the amplitude variance signal 316d from the control logic 211 and converts it into a stable signal 315 so as to inform the laser controller 22 that the MEMS mirror 10 has become stable. According to various combinations of the first, the second and the third modulation signals 316a, 316b, 316c, the bridge circuit 212 generates different driving signals for control of the amplitude of the MEMS mirror 10. When the MEMS mirror 10 oscillates, once the time interval (cycle T) that the amplitude of the MEMS mirror 10 triggers the PD 14a and the PD 14b respectively twice becomes stable, the laser controller 22 sends the scan data 319.

The MEMS mirror 10 oscillates to the right and left at the angle $\pm\theta_c$. When the scanning light arrives the PD 14a, a first-time triggered PD signal 312a is generated. When the MEMS mirror 10 oscillates to the right edge with an angle $\theta_c$, then it moves back. When the scanning light arrives the PD 14a, a second-time triggered PD signal 312a is generated. When the scanning light arrives within the effective scanning window (from 113a to 113b, the point a to the point b in FIG. 2), now the relationship between the angle θ(t) and the time t is most close to a line. This is the effective scanning window of the forward scanning. When the MEMS mirror 10 oscillates to the left edge with an angle $-\theta_c$, it moves back. When the scanning light arrives within the effective scanning window (from 113b to 113a, the point b' to the point a' in FIG. 2), this is the effective scanning window of the reverse scanning.

When the MEMS mirror 10 keeps moving to the right and the scanning light arrives the PD 14a, a third-time triggered PD signal 312a is generated and a scan cycle $\theta_c$ is completed. When the MEMS mirror 10 moves to the maximum angle $\theta_c$, starts moving back, and the scanning light arrives the PD 14a, a fourth-time triggered PD signal 312a is generated. Within a cycle of the scanning light, there are four PD signal generated by triggering.

When the MEMS mirror 10 oscillates, each scan cycle T/2, the scanning light 114a triggers the PD 14a twice while the scanning light 114b triggers the PD 14b twice. Thus the control logic 211 calculates the trigger cycle T of the PD signals 312a, 312b, generation time of each PD signals 312a, 312b from the PD 14a, 14b, and generates the first, the second and the third modulation signals 316a, 316b, 316c of the MEMS mirror 10. The bridge circuit 22 receives the modulation signals 316a, 316b, 316c and generates the driving signals 311 for adjusting amplitude of the MEMS mirror 10.

Figure 11:
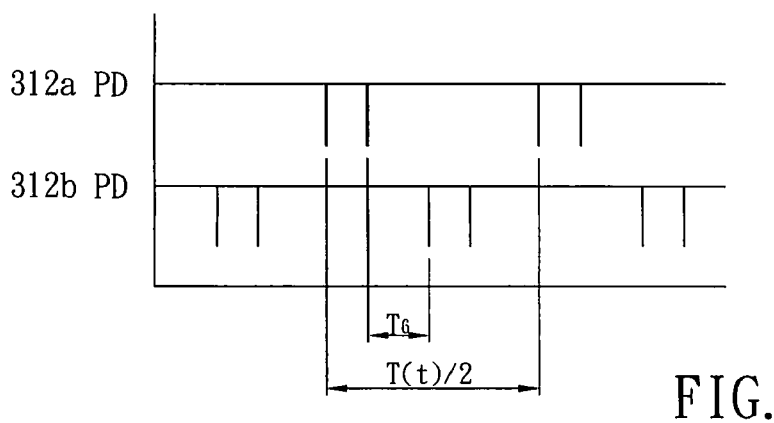
FIG. 11 shows relationship between PD signals and time of the embodiment in FIG. 10.

After the MEMS mirror 10 reflecting the laser light 111, the MEMS mirror 10 oscillates from the left side to the right side to trigger the PD 14a twice and trigger the PD 14b twice. The time interval between the second trigger of the two contiguous triggers of the PD 14a and the first trigger of the PD 14b is $TA_6$. When the MEMS mirror 10 becomes stable, the $TA_6$ also becomes stable. The way of the MEMS scan controller 21 to control the amplitude of the MEMS mirror 10 is the same with that of the first embodiment, as shown in FIG. 11. In this embodiment, the PD 14a and the PD 14b are arranged at the angle $\theta_p=21°$. That means when the f=2500 HZ, $TA_6=1.4651\times10^{-4}$ sec. is obtained through the Eq. (6). $TA_6=1.5090\sim1.4211\times10^{-4}$ sec. is criteria to check whether the MEMS mirror 10 becomes stable.

The Third Embodiment

Figures 12, 13, 14:
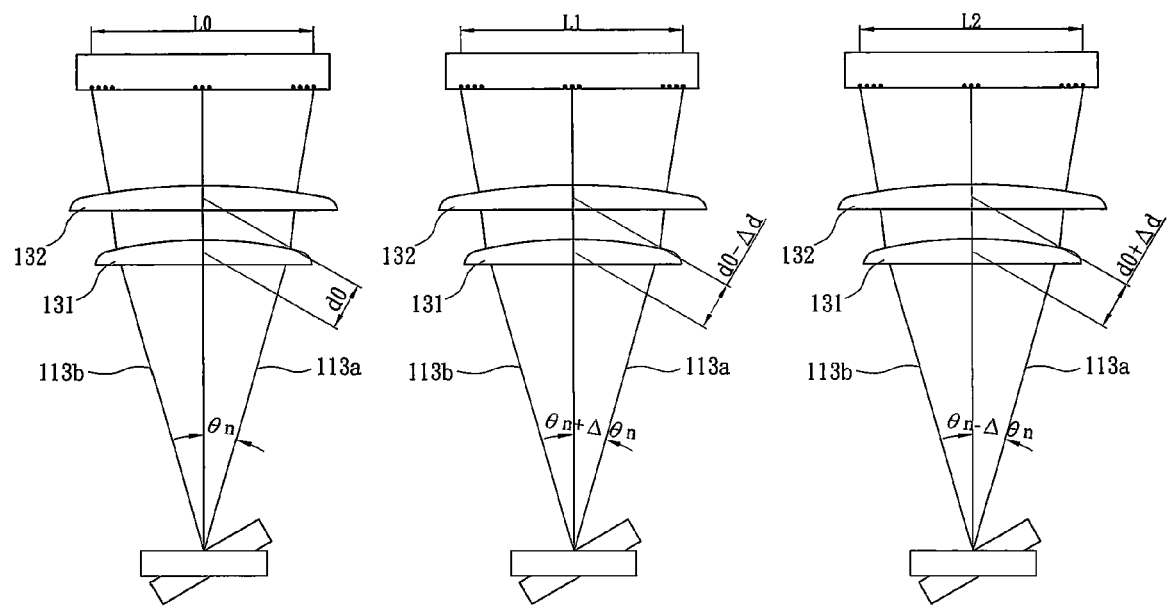
FIG. 12, FIG. 13 & FIG. 14 show relationship between scanning angle and change of inherent resonant frequency of a further embodiment of the MEMS mirror with two lenses according to the present invention.

The embodiment is applied to a MEMS LSU with a PD and a scan lens having two lenses. The scan lens 13 consists of a first scan lens 131 and a second scan lens 132 for matching high precision requirement, or minimum difference of paper to be printed for two laser printers or multifunction printers. As shown in FIG. 12, the first scan lens 131 is an angle correction lens. By the distance between the first scan lens 131 and the second scan lens 132, the scanning light 113a~113b incident into the first scan lens 131 is adjusted into the same with the scanning light incident into the second scan lens 132. Through the second scan lens 132 that is lens with linear function, the reflected scanning light is corrected into a linear one. As shown in FIG. 13, FIG. 14, the MEMS mirror 10 with inherent resonant frequency $f_0$=2500 HZ is used, the same with the first embodiment. Under the condition that the laser printers or multifunctional printers with preset data transmission frequency $f_0$=2500 HZ and preset transmission time $T_2=T_4$=0.1458 msec, the scan window is $2\theta_n$=2*20.947°, the distance between centers of the first and the second scan lenses 131, 132 on the optical axis is 12.5 mm ($d_0$=12.5 mm), the image length on the object 15 is $L_0$. Generally, the $L_0$ is 95% of the width of A4 size paper (216 mm). Once there is an individual difference such as 3% between the inherent resonant frequency $f_0$ of the MEMS mirrors 10 on different MEMS LSUs, a difference of $\Delta\theta_n$=0.3295 is generated on the scan window and such difference causes ±1.6 mm difference on $L_0$. The difference on $L_0$ is brought by the effect of individual difference of inherent resonant frequency $f_0$ of the MEMS mirrors 10. In order to correct the difference, adjust the relative distance between the first and the second scan lenses 131, 132 of the MEMS mirror 10 with resonant frequency of 2425 HZ ($f_0$=2425 HZ) into $d_0$–$\Delta d$. In this embodiment, the distance between centers of the first and the second scan lenses 131, 132 on the optical axis is $d_0$–$\Delta d$=12.364 (mm). In similar way, the distance between centers of the first and the second scan lenses 131, 132 of the on the MEMS mirror 10 with resonant frequency of 2575 HZ ($f_0$=2575 HZ) optical axis is $d_0$+$\Delta d$=12.636 (mm). Thus the difference among the image length $L_0$ caused by difference of inherent resonant frequency of the MEMS mirrors 10 is compensated so that the scanning results can be more precise.

As to MEMS with two PD, the same control way and adjustment in this embodiment are able to be used.

The Fourth Embodiment

Protocol Control with the Laser Controller

Figure 10:
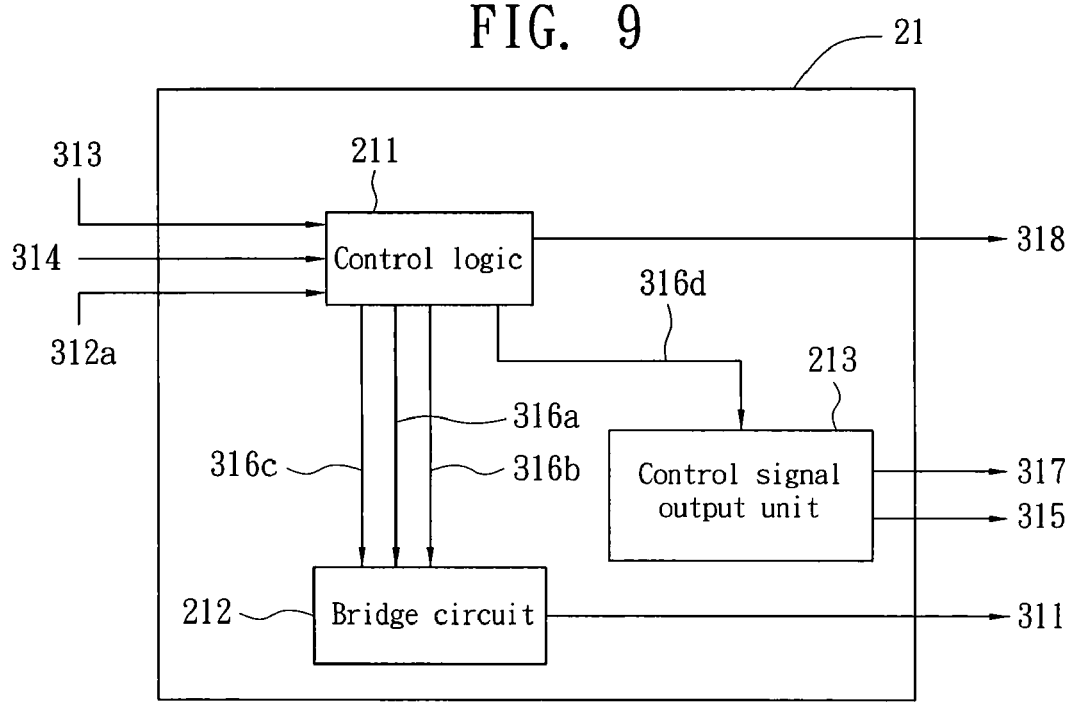
FIG. 10 is a schematic drawing of another embodiment of a MEMS scan controller according to the present invention.

Refer to FIG. 10, after the MEMS mirror 10 becoming stable, the control signal output unit 213 of the MEMS scan controller 21 further sends trigger signals 317 to the laser controller 22. The trigger signal 317 is preset. While receiving the trigger signals 317, the laser controller 22 starts/or stops sending the scan data 319. In this embodiment, the trigger signal turns from low potential to high potential at a point a (or point b') in FIG. 2. When the laser controller 22 receives the stable signal 315 and the trigger signal 317 is high-potential, start to send the scan data 319. When the MEMS mirror 10 oscillates to the point b (or point a') in FIG. 2, the trigger signal 317 turns from high potential to low potential. When the laser controller 22 receives the stable signal 315 and the trigger signal 317 is low-potential, stop sending the scan data 319. Thus the scan data 319 of the laser controller 22 is easy to be controlled.

The Fifth Embodiment

Another Protocol Control with the Laser Controller

When the MEMS mirror 10 starts oscillating, the control logic 211 receives photoelectric signals from the PD 14a and the control logic 211 calculates resonant frequency and amplitude of the MEMS mirror 10. In this embodiment, the control logic 211 further checks whether the resonant frequency of the MEMS mirror 10 and the frequency $f_{data}$ of the scan data 319 from the laser controller 22 match each other. Once the answer is not ($f_{data}$ is away from preset value), the control logic 211 sends frequency error signals 318, as shown in FIG. 10. The laser controller 22 receives the frequency error signals 318 and adjusts the scan frequency $f_{data}$. By such adjustment of the scan frequency $f_{data}$, the scan data 319 is transmitted more precisely within the scan window.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A Micro-Electronic-Mechanical-System (MEMS) scan controller with inherent frequency applied to a laser scanner unit formed by a laser source emitting laser light, a MEMS mirror that drives a reflection mirror by a resonant way to scan the laser light forward/reverse through the object, a photoelectric detector (PD) that receives scanning light and turns the scanning light into PD signals, a scan lens that turns the scanning light into a linear relationship between angle and time and a laser controller that controls emitting of the laser source with preset frequency and time interval; wherein the MEMS scan controller comprising: a control logic, a control signal output unit and a bridge circuit; wherein the MEMS scan controller adjusts amplitude of the MEMS mirror by using the inherent resonant frequency of the MEMS mirror;

the control logic receives PD signals from the PD, calculates time interval of the PD signals to generate modulation signal of the MEMS mirror sent to the bridge circuit and amplitude variation signal of the MEMS mirror sent to the control signal output unit;

the control signal output unit receives the amplitude variation signal from the control logic and turns the amplitude variation signal into stable signal that control the laser controller;

the bridge circuit receives the modulation signal from the control logic and turns the modulation signal into driving signal that drive the MEMS mirror to oscillate;

thereby the laser scanner sends scan data string with preset frequency and time interval within effective scan window.

2. The MEMS scan controller with inherent frequency as claimed in claim 1, wherein the scan lens of the laser scanner comprising a first scan lens and a second scan lens; wherein the effect of individual difference in inherent frequency of the MEMS mirror can be compensated by adjusting the relative distance on an optical axis between the first scan lens and the second scan lens.

3. The MEMS scan controller with inherent frequency as claimed in claim 1, wherein the control signal output unit receives a stable signal of the MEMS mirror from the control logic and further sends a trigger signal for control of the laser controller to start/stop sending the scan data string.

4. The MEMS scan controller with inherent frequency as claimed in claim 1, wherein the control logic compares resonant frequency of the MEMS mirror with preset scan data frequency of the laser controller and further sends frequency error signals to the laser controller.

5. A Micro-Electronic-Mechanical-System (MEMS) scan controller with inherent frequency applied to a laser scanner unit formed by a laser source emitting laser light, a MEMS mirror that drives a reflection mirror by a resonant way to scan the laser light forward/reverse through the object, two photoelectric detectors (PD) that receives scanning light and turns the scanning light into PD signals, a scan lens that turns the scanning light into a linear relationship between angle and time and a laser controller that controls emitting of the laser source with preset frequency and time interval; wherein the MEMS scan controller comprising: a control logic, a control signal output unit and a bridge circuit; wherein the MEMS scan controller adjusts amplitude of the MEMS mirror by using the inherent resonant frequency of the MEMS mirror;

the control logic receives PD signals from the two PDs, calculates time interval of the two PD signals to generate modulation signal of the MEMS mirror sent to the bridge circuit and amplitude variation signal of the MEMS mirror sent to the control signal output unit;

the control signal output unit receives the amplitude variation signal from the control logic and turns the amplitude variation signal into stable signal that control the laser controller;

the bridge circuit receives the modulation signal from the control logic and turns the modulation signal into driving signals that drive the MEMS mirror to oscillate;

thereby the laser scanner sends scan data string with preset frequency and time interval within effective scan window.

6. The MEMS scan controller with inherent frequency as claimed in claim 1, wherein the scan lens of the laser scanner comprising a first scan lens and a second scan lens; wherein the effect of individual difference in inherent frequency of the MEMS mirror can be compensated by adjusting the relative distance on an optical axis between the first scan lens and the second scan lens.

7. The MEMS scan controller with inherent frequency as claimed in claim 5, wherein the control signal output unit receives a stabilized signal of the MEMS mirror from the control logic and further sends a trigger signal for control of the laser controller to start/stop sending the scan data string.

8. The MEMS scan controller with inherent frequency as claimed in claim 5, wherein the control logic compares resonant frequency of the MEMS mirror with preset scan data frequency of the laser controller and further sends frequency error signals to the laser controller.

9. A control method for MEMS scan controllers with inherent frequency applied to a MEMS scan controller with one PD comprising the steps of:

S1: checking whether a laser controller sends enable (ENB) signals or not; once the laser controller sends the ENB signal, a MEMS scan controller is turned on and a control logic of the MEMS scan controller sends modulation signals for driving a bridge circuit to make a MEMS mirror start oscillation; the control logic also calculates scan frequency and scan amplitude;

S2: sending modulation signals by the control logic of the MEMS scan controller so as to make the MEMS mirror oscillate stably with preset amplitude;

S3: sending stable signals to the laser controller by a control signal output unit of the MEMS scan controller after the MEMS mirror becoming stable.

10. The method as claimed in claim 9, wherein in the step of sending stable signals to the laser controller by a control signal output unit of the MEMS scan controller after the MEMS mirror becoming stable, the control signal output unit further sends trigger signals that make the laser controller start/stop sending scan data string.

11. The method as claimed in claim 9, wherein when the method is applied to the MEMS scan controller with one PD, the step S2 further comprising the steps of:

S21: setting an initial value of load D and set an initial value of cycle T;

S22: checking the PD signals and whether there are triggered twice of the PD within a half cycle T; if not, start to adjust the amplitude;

S23: checking the ratio of two triggering time of the PD signal to the whole cycle, if the ratio is over preset range, adjust the amplitude;

S24: while adjusting the amplitude, adjusting the value of the load D so that there are two PD signals of the PD triggered within a half-cycle; once the value of the load D becomes stable, the amplitude of the MEMS mirror is stable.

12. The method as claimed in claim 9, wherein when the method is applied to the MEMS scan controller with two PDs, the step S2 further comprising the steps of:

S21: setting an initial value of load D and set an initial value of cycle T;

S22: checking the PD signals and whether there are triggered twice of the same PD within a half cycle T; if not, start to adjust the amplitude;

S23: checking the ratio of two triggering time of the PD signal to the whole cycle, if the ratio is over preset range, adjust the amplitude;

S24: while adjusting the amplitude, adjusting the value of the load D so that there are two PD signals triggered within a half-cycle; once the value of the load D becomes stable, the amplitude of the MEMS mirror is stable.

\* \* \* \* \*